United States Patent Office 2,999,091
Patented Sept. 5, 1961

2,999,091
3,9-DIAZABICYCLO[4.2.1]NONANE DERIVATIVES
Harold E. Zaugg, Lake Forest, Ill., assignor to Abbott Laboratories, North Chicago, Ill., a corporation of Illinois
No Drawing. Filed Oct. 23, 1959, Ser. No. 848,235
12 Claims. (Cl. 260—239.3)

This invention relates to novel bicyclic homopiperazines and derivatives thereof, in particular, bicyclic homopiperazines of the type:

I.
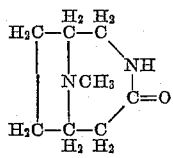

and

II.
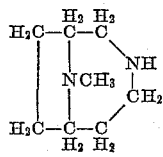

The structure represented by I is identified by the name of 9-methyl-3,9-diazabicyclo[4.2.1]nonane-4-one and the structure represented by II is identified by the chemical name of 9-methyl-3,9-diazabicyclo[4.2.1]-nonane. The foregoing bicyclic homopiperazines are useful as intermediates for preparing novel compounds having useful pharmacological properties of the type represented by:

III.
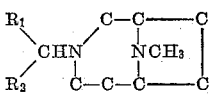

where $R_1$ is phenyl or halophenyl wherein a halogen is substituted at one or more of the ortho, meta or para positions and $R_2$ is phenyl, a halophenyl of the type defined by $R_1$ or cyclohexyl; and $R_1$ and $R_2$ taken together with the adjacent CH represents a fluorenyl group as shown by:

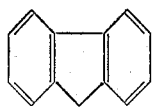

The presence of basic nitrogens in the structures of the foregoing compounds provides a situs for acid addition and quaternary ammonium salt formation. Thus, Compounds III form non-toxic salts with many organic and inorganic acids including sulfuric, phosphoric, hydrochloric, hydrobromic, hydriodic, sulfamic, citric, lactic, maleic, malic, succinic, cyclohexylsulfamic, tartaric, cinnamic, acetic, oxalic and the like. The compounds can be quaternized on one or both of the nitrogen atoms by the addition of an alkyl ester of a strong inorganic acid such as sulfuric, hydriodic, hydrobromic and the like or an organic sulfonic acid such as benzenesulfonic, toluenesulfonic, ethylsulfonic and the like. The representative quaternary ammonium salt can accordingly be dimethylsulfate, methylbenzenesulfonate, methyliodide, ethylbromide and the like.

It is within the scope of this invention to provide the art with the novel structures which can be embodied as intermediates for the production of compounds possessing useful pharmacological properties. The novel and unique bicyclic homopiperazines represented by I and II are provided to the skilled practitioner in order to prepare novel derivatives in a well-defined area. The bicyclic heterocyclic structures presented herein can be employed to prepare analogs of the type of compounds which have heretofore been characterized by containing a tropane nucleus. The tropane nucleus is also a bicyclic heterocyclic structure represented by the formula:

IV.
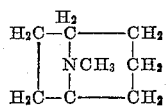

This structure is well-known to the skilled practitioner in the anticholinergic field. It is an essential component of the atropine molecule. The alcohol form of this structure is known as tropine or tropanol and various esters of tropine are generically known as tropeines. Among such esters are the solanaceous alkaloids among which number are found the well-known atropine and hyoscyamine. A structure closely related to tropane is the carbonyl-containing nucleus known as tropanone. Many tropanone derivatives and tropeines have been disclosed in the art to possess important pharmacological properties as mydriatic, antispasmodics, hypotensives and other properties which can be sub-generically classified under the pharmacological headings of ganglionic blocking agents, e.g., hypotensives; and parasympatholytic agents, e.g., antispasmodics, mydriatics. Still other tropeine derivatives are known to be useful as local anesthetics.

Novel tropane derivatives and tropeines have been shown to possess the parasympatholytic property of relieving smooth muscle spasms in U.S. 2,883,887, U.S. 2,800,479, U.S. 2,800,478, U.S. 2,800,476 and U.S. 2,799,481. The ganglionic blocking property as manifested by the ability to lower blood pressure has been attributed to novel tropanes and tropeines in U.S. 2,902,490, British 808,926 and British 811,132. The local anesthetic properties of such characteristic derivatives has been disclosed in British 813,218 wherein the parasympatholytic properties of the derivatives were also described.

The novel Derivatives III described herein have ganglionic blocking actions as depicted by their hypotensive properties. The Derivatives III also possess useful properties as serotonin antagonists and as antihistamines which indicates that other compounds prepared from the novel bicyclic homopiperazines could have a degree of usefulness which is greater than the expected ganglionic blocking and parasympatholytic.

In addition to the novel derivatives of said bicyclic homopiperazines presented herein, it is, accordingly, intended that the usefulness of said bicyclic homopiperazines can be extended to preparing compounds analogous to the tropane and tropeine derivatives discussed hereinbefore. The disclosure of the instant, unique and novel bicyclic homopiperazines provides the art with an import key to preparing many compounds of potential usefulness in the general area defined by the well-established tropane, tropanone and tropeine compounds.

The Compound I is prepared by reacting tropanone with hydrazoic acid. A preferred procedure for preparing said compound provides reacting tropanone with an azide salt in the presence of a strong mineral acid. Thus, tropanone is reacted with sodium azide in the presence of concentrated sulfuric acid. The foregoing preferred embodiment of making this compound obviates the hazards entailed with handling hydrazoic acid. It is understood that various other azides can be employed such as ammonium azide, potassium azide, calcium azide and the like in the presence of any strong acid which will provide the necessary acid conditions for the first step of the preferred embodiment. The practice of choice provides that the reaction is conducted in the presence of a solvent such as chloroform wherein the desired product is soluble. The desired product is separated by adding alkaline agents to the solvent mixture in order to neutralize the acid and to salt out the product. The formed inorganic salts can be removed and the solvent filtrate, separated, dried and distilled in order to isolate the desired product.

The bicyclic homopiperazine II is prepared from I by reducing I with lithium aluminum hydride.

The novel Derivatives III are prepared by reacting II with a halide of the type:

V. 

where $R_1$ and $R_2$ are phenyl or halophenyl or together with the adjacent CH form a fluorenyl. The reaction is performed in the presence of an acid acceptor to take up the hydrogen halide which is produced. Acid acceptors which operate in the reaction are alkali-metal carbonates and bicarbonates such as sodium carbonate, potassium bicarbonate; and tertiary amines such as trimethylamine, triethylamine, pyridine, quinoline and the like.

Where one of the groups represented by $R_1$ or $R_2$ is an unsubstituted phenyl, it can be reduced by hydrogenation in the presence of an appropriate catalyst, such as platinum oxide, to prepare the cyclohexyl phenyl or cyclohexyl halophenyl derivative.

The following examples are presented to illustrate the practice of this invention, but it must be understood that such examples are not intended to be exclusive embodiments.

EXAMPLE I

*9-methyl-3,9-diazabicyclic [4.2.1] nonane-4-one*

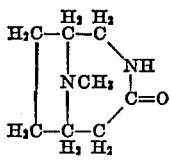

A solution is prepared by adding 11.1 g. (0.08 mole) of 3-tropanone in 100 cc. of chloroform. The solution is cooled to —5° C. in an ice-salt bath. This solution is treated dropwise with stirring with 25 cc. of concentrated sulfuric acid while maintaining the temperature below 15° C. and then treating with 10.4 g. (0.16 mole) of sodium azide in portions of 0.5–1 g. at such a rate that the temperature does not exceed 35° C. The addition of the acids requires about two hours after which the reaction mixture is stirred at 50° C. for an additional two hours. The reaction mixture is then poured into a 600 cc. beaker which is ⅓ filled with ice. Solid potassium carbonate is added portionwise until the mixture is strongly alkaline. Following this step, 50 cc. of 60% potassium hydroxide solution is added. These inorganic salts are removed by filtration and washed well with chloroform. The alkaline filtration is extracted with three portions of chloroform and the combined chloroform washings and extracts are dried over anhydrous sodium sulfate. The drying agent is removed by filtration and then the chloroform is removed by distillation to obtain 9-methyl-3,9-diazabicyclo [4.2.1] nonane-4-one in a yield of 11.1 g. (90%). A sample of the obtained product is converted to the hydrochloride salt by combining the base with ethanol-hydrogen chloride. The obtained hydrochloride salt has a melting point of 258–259° C. (dec.).

Anal. calcd. for $C_8H_{15}ClN_2O$. Theory: C, 50.39%; H, 7.93%; N, 14.69%. Found: C, 50.42%; H, 7.96%; N, 14.59%.

EXAMPLE II

*9-methyl-3,9-diazabicyclo [4.2.1] nonane*

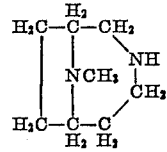

A solution is prepared by placing 11.0 g. (0.07 mole) of the base prepared in Example I in 400 cc. of dry ether. To this solution is added dropwise with stirring under an atmosphere of dry nitrogen a solution of 6.8 g. (0.18 mole) of lithium aluminum hydride in 200 cc. of dry ether. Addition is complete in ½ hour and then the mixture is stirred and refluxed for 46 hours. The reaction mixture is cooled and 25 cc. of water is added into it dropwise. The reaction mixture is then filtered by suction. The filter-cake is washed with ether and the combined filtrate and washings are dried over anhydride sodium sulfate. The sodium sulfate is removed by filtration and then the ether is removed by distillation. The residual oil is vacuum distilled to yield 6.8 g. (68%) of 9-methyl-3,9-diazabicyclo [4.2.1] nonane, B.P. 111–113° C. (38 milliliters), $n_D^{24}$ 1.4992.

Anal. calcd. for $C_8H_{16}N_2$. Theory: C, 68.52%; H, 11.50%; N, 19.98%. Found: C, 68.71%; H, 11.91%; N, 20.26%.

The dihydrochloride salt of 9-methyl-3,9-diazabicyclo-[4.2.1]nonane is prepared by combining said base with hydrogen chloride in dry ethanol. The obtained hydrochloride salt has a melting point of 290–291° C. (dec.).

Anal. calcd. for $C_8H_8Cl_2N_2$. Theory: C, 45.08%; H, 8.51%. Found: C, 45.46%; H, 8.61%.

EXAMPLE III

*4-(p-chlorobenzhydryl)-9-methyl-4,9-diaza[4.2.1]-bicyclononane*

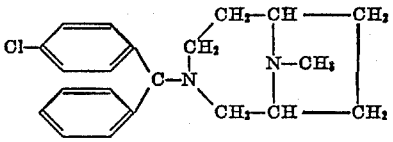

A solution of 5.9 g. (0.25 mole) of p-chlorobenzhydryl chloride in 20 cc. of dry xylene is added dropwise over a period of a few minutes to a stirred mixture of 3.5 g. (0.25 mole) of 9-methyl-4,9-diazo[4.2.1]bicyclononane and 4.0 g. (.04 mole) of triethylamine in 70 cc. of dry xylene. The resulting mixture is stirred and refluxed for 22 hours. The reaction mixture is cooled and filtered to remove the triethylamine hydrochloride and the xylene is removed by distilling under reduced pressure. The collected oil residue is taken up in 50 cc. of dry ether and a slight excess of an etheral-oxalic acid is added. The oxalate salt of 4-(p-chlorobenzhydryl)-9-methyl-4,9-diaza[4.2.1]bicyclononane is obtained as an oil which solidifies upon standing. The crude salt is recrystallized from absolute ethyl-ether and the product is obtained in a yield of 0.2 g., M.P. 91° C.

Anal. calcd. for $C_{21}H_{25}ClN_2$ ½ $H_2O$. Theory: C, 62.79%; H, 6.44%; N, 6.37%; Cl, 8.06%; O, 16.37%. Found: C, 62.28%; H, 6.61%; N, 6.95%; Cl, 7.61%; O, 16.44%.

4-(benzhydryl)-9-methyl-4,9-diaza[4.2.1]bicyclonone is prepared by employing benzhydryl chloride as the reactant according to the process steps of Example III. In like manner, 4-(9'-fluorenyl)-9-methyl-4,9-diaza[4.2.1]- bicyclonone is prepared by reacting 9-fluorenyl chloride with 9-methyl-4,9-diaza[4.2.1]bicyclononane. The halophenyl compounds, 4-(p,p'-dichlorobenzhydryl)-9-methyl-4,9-diaza[4.2.1]bicyclonone and 2,4-(dichlorobenzhydryl)-9-methyl-4,9-diaza[4.2.1]bicyclonone are likewise prepared by respectively employing p,p'-dichlorobenzhydryl chloride and 2,4-dichlorobenzhydryl chloride as reactants.

EXAMPLE IV

*4-(phenylcyclohexylmethyl)-9-methyl-4,9-diaza[4.2.1]-bicyclononane*

To 30 cc. of water is added 9.2 g. (0.03 mole) of 4-(benzhydryl)-9-methyl-4,9-diaza[4.2.1]bicyclononane and then 0.28 g. (about 3% based on weight of the reactant) of platinum oxide. The mixture is hydrogenated at 55–60° C. under 30 pounds pressure. The mixture is filtered while warm and then the filtrate is concentrated to dryness under reduced pressure to obtain the product, 4 - (phenylcyclohexylmethyl) - 9 - methyl - 4,9 - diaza[4.2.1]bicyclononane.

Others may practice the invention in any of the numerous ways which will be suggested by this disclosure to one skilled in the art. All such practice of the invention is considered to be a part hereof provided it falls within the scope of the appended claims.

I claim:

1. A compound selected from the class consisting of bases represented by:

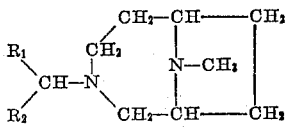

where $R_1$ is selected from the class consisting of phenyl and chlorophenyl; $R_2$ is selected from the class consisting of phenyl, chlorophenyl and cyclohexyl and $R_1$ and $R_2$ together with the adjacent CH is fluorenyl; the non-toxic acid addition salts thereof and the non-toxic lower-alkyl quaternary ammonium salts thereof.

2. The compound:

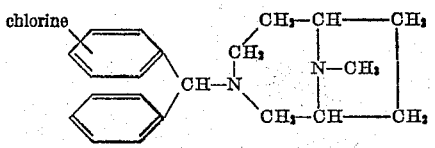

3. 4-(p-chlorobenzhydryl)-9-methyl-4,9-diaza[4.2.1]bicyclononane.
4. 4 - (benzhydryl) - 9 - methyl - 4,9 - diaza[4.2.1]-bicyclononane.
5. 4,9' - (fluorenyl) - 9 - methyl - 4,9 - diaza[4.2.1]-bicyclononane.
6. 4 - (phenylcyclohexylmethyl) - 9 - methyl - 4,9 - diaza[4.2.1]bicyclononane.
7. 9-methyl-3,9-diazabicyclic[4.2.1]nonane-4-one.
8. 9-methyl-3,9-diazabicyclo[4.2.1]nonane.
9. The method for making 9-methyl-3,9-diazabicyclic[4.2.1]nonan-4-one which comprises the steps of reacting 3-tropanone with a compound selected from the class consisting of hydrazoic acid and a salt of hydrazoic acid.
10. The method for making 9-methyl-3,9-diazabicyclic[4.2.1]nonan-4-one which comprises the steps of reacting 3-tropanone with an alkali salt of hydrazoic acid in the presence of a strong mineral acid, adding an alkaline agent to said reaction mixture to neutralize said mineral acid, separating the filtrate from the reaction mixture and obtaining therefrom 9-methyl-3,9-diazabicyclic[4.2.1]nonan-4-one.
11. The method for making 9-methyl-3,9-diazabicyclo[4.2.1]nonane which comprises the method of claim 9 with the additional step of reducing 9-methyl-3,9-diazabicyclic[4.2.1]nonan-4-one with lithium aluminum hydride.
12. The method for making 9-methyl-3,9-diazabicyclo[4.2.1]nonane which comprises the method of claim 10 with the additional step of reducing 9-methyl-3,9-diazabicyclic[4.2.1]nonan-4-one with excess lithium aluminum hydride under reflux conditions.

No references cited.